US011260971B2

(12) United States Patent
Weller

(10) Patent No.: US 11,260,971 B2
(45) Date of Patent: Mar. 1, 2022

(54) ENCLOSED UNMANNED AERIAL VEHICLE

(71) Applicant: Aaron Weller, Beaufort, SC (US)

(72) Inventor: Aaron Weller, Beaufort, SC (US)

( * ) Notice: Subject to any disclaimer, the term of this patent is extended or adjusted under 35 U.S.C. 154(b) by 70 days.

(21) Appl. No.: 15/050,619

(22) Filed: Feb. 23, 2016

(65) Prior Publication Data

US 2016/0244162 A1  Aug. 25, 2016

Related U.S. Application Data

(60) Provisional application No. 62/119,569, filed on Feb. 23, 2015.

(51) Int. Cl.
*B64C 39/02* (2006.01)

(52) U.S. Cl.
CPC ...... *B64C 39/024* (2013.01); *B64C 2201/027* (2013.01); *B64C 2201/042* (2013.01); *B64C 2201/108* (2013.01)

(58) Field of Classification Search
CPC ............ B64C 39/024; B64C 2201/027; B64C 2201/042; B64C 2201/108
See application file for complete search history.

(56) References Cited

U.S. PATENT DOCUMENTS

| 2,938,298 | A | * | 5/1960 | Apostolescu | .......... | A63H 27/12 |
| | | | | | | 446/37 |
| 6,179,247 | B1 | * | 1/2001 | Milde, Jr. | ............... | B64C 29/00 |
| | | | | | | 244/23 A |
| 7,273,195 | B1 | | 9/2007 | Golliher | | |
| 7,806,362 | B2 | | 10/2010 | Yoeli | | |
| 7,931,239 | B2 | * | 4/2011 | Pedersen | .................. | B60V 1/06 |
| | | | | | | 244/189 |
| 8,473,123 | B2 | * | 6/2013 | Sun | .......................... | B64C 27/20 |
| | | | | | | 244/12.1 |
| 8,573,529 | B2 | * | 11/2013 | Mohamadi | ............ | B64C 39/024 |
| | | | | | | 244/23 A |
| 9,061,558 | B2 | * | 6/2015 | Kalantari | .............. | B64C 39/028 |
| 9,067,667 | B2 | * | 6/2015 | Yan | ............................ | B64C 1/00 |
| 9,145,207 | B2 | * | 9/2015 | Moschetta | .............. | B64C 25/36 |
| 9,611,032 | B2 | * | 4/2017 | Briod | ..................... | B64C 17/00 |
| 9,650,134 | B2 | * | 5/2017 | Chappell | ............... | B64C 39/024 |

(Continued)

FOREIGN PATENT DOCUMENTS

| CN | 203318681 U | 12/2013 |
| WO | 2013060693 A2 | 5/2013 |

(Continued)

OTHER PUBLICATIONS

International search report, International application No. PCT/US16/19111. dated Jul. 8, 2016. ISA/US, Alexandria, VA.

*Primary Examiner* — Justin M Benedik
(74) *Attorney, Agent, or Firm* — Gregory Finch; Finch Paolino, LLC

(57) ABSTRACT

The present disclosure is directed to a propeller driven remote control flying device having an enclosed body. The motor and propellers of the device can be contained within the enclosed body. The enclosed body can include a plurality of pores through which air passes, with one side of the body generally functioning as an air intake, and the opposite side of the body functioning as an air outlet. The pores can be sufficiently small so as to prevent contact between persons, animals or articles and the motor driven propellers.

13 Claims, 9 Drawing Sheets

(56) References Cited

U.S. PATENT DOCUMENTS

| | | | | |
|---|---|---|---|---|
| 9,725,170 B2* | 8/2017 | Daler | ................ | B64C 17/00 |
| 2002/0104921 A1* | 8/2002 | Louvel | ................ | A63H 27/04 |
| | | | | 244/12.1 |
| 2010/0224723 A1 | 9/2010 | Apkarian | | |
| 2014/0131507 A1 | 5/2014 | Kalantari et al. | | |
| 2016/0137293 A1* | 5/2016 | Santangelo | ........... | B64C 39/024 |
| | | | | 244/50 |
| 2016/0200415 A1* | 7/2016 | Cooper | ................ | B64C 27/20 |
| | | | | 244/17.15 |
| 2016/0229530 A1 | 8/2016 | Welsh et al. | | |
| 2017/0291697 A1* | 10/2017 | Kornatowski | .......... | B64C 27/20 |

FOREIGN PATENT DOCUMENTS

| | | |
|---|---|---|
| WO | WO2013060693 A2 | 5/2013 |
| WO | 2015105554 A1 | 7/2015 |
| WO | WO2015105554 A1 | 7/2015 |
| WO | 2015149000 A1 | 10/2015 |
| WO | WO2015149000 A1 | 10/2015 |

* cited by examiner

ENCLOSED UNMANNED AERIAL VEHICLE

CROSS-REFERENCE TO RELATED APPLICATIONS

This disclosure claims the benefit of and priority to U.S. Provisional Patent Application No. 62/119,569 filed on Feb. 23, 2015, the entire contents of which are incorporated by reference herein.

BACKGROUND

1. Technical Field

Embodiments of this disclosure relate to remote control devices generally, more particularly to remotely controlled flying devices.

2. Background of Related Art

Remote control flying devices are increasing in popularity. Remote control flying devices typically comprise propellers that are driven by electric motors. Actuators, such as servo motors, control flying characteristics, such as direction, altitude, and speed. Drones were originally developed for use by the military in the context of special operations. The technology has spread to civilian applications such as policing, firefighting, and security. Many are predicting that the developed world is on the cusp of a dramatic revolution in the use of drones for non-governmental use. Quartz (www.qz.com) published an article in January 2013 titled "[t]he private drone industry is like Apple in 1984."

There are good reasons to conclude that drone technology may soon impact the daily lives of everyday consumers. Amazon CEO Jeff Bezos dominated the headlines during the busy Christmas shopping season of 2013 when he announced that Amazon was testing drone technology as a potential delivery system for some Amazon products. In February 2014, the www.aviationpros.com website in February 2014 publicized two reports predicting a global drone market of $8.35 billion by 2018 and $14.7 billion by 2023. In response to the anticipated wide-spread adoption of drone technology, the Federal Aviation Administration ("FAA") issued a "road map" on Nov. 7, 2013 that identified technical, regulatory, and procedural issues that would need to be overcome for the widespread integration of drones into commercial airspace. Numerous state legislatures have enacted or are considering the enactment of laws addressing privacy and safety concerns pertaining to the proper use of drones.

In anticipation of burgeoning governmental and private markets for drones, there are significant ongoing efforts to improve drone technology in certain respects. In the past, such devices have been primarily used as toys, but there is increasing interest in the use of such devices for delivering payloads, such as packages, or for utility functions, such as photography. A problem associated with the use of propeller driven remote control devices is the danger of contact of the motor driven propellers with humans, animals, or other objects. Rapidly spinning motor driven propellers can cause serious injury to humans, animals and property. Further, motor driven propellers can become entangled in vegetation or other objects, causing loss of the remote control device, or disabling or damaging the remote control device.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with at least one aspect of this disclosure, a remote control flying device can include an enclosed housing. The remote control flying device can include a first portion of a housing comprising a first plurality of pores on a surface of the first portion of the housing. A second portion of a housing can include a second plurality of pores on a surface of the second portion of the housing. The first portion of the housing and the second portion of the housing can be mounted together to form an enclosed housing, and the first portion of the housing and the second portion of the housing can be spaced apart to form an interior compartment within the housing. At least one motor driven propeller can be mounted in the interior compartment within the housing wherein the pores of the first portion and the pores of the second portion can be constructed and arranged to permit air to pass from an exterior of the housing through the interior compartment of the housing and to an exterior of the housing through the first portion and/or the second portion, and wherein air can be pulled through the housing by the at least one motor driven propeller.

In accordance with at least one aspect of the present disclosure, an unmanned aerial vehicle housing can include a top portion, having a plurality of pores defined through the surface of the top portion. The housing can include a bottom portion includes a plurality of pores defined through the surface of the bottom portion wherein the top portion and the bottom portion at least partially form an interior compartment.

In accordance with at least one aspect of the present disclosure, an enclosed unmanned aerial vehicle comprising a first portion of a housing, the first portion of the housing comprising a first plurality of pores on a surface of the first portion of a housing, the first portion of the housing being concave in shape and being tapered in width from a first end to a second end; a second portion of a housing, the second portion of the housing comprising a second plurality of pores on a surface of the second portion of a housing, the second portion of the housing being convex in shape and being tapered in width from a first end to a second end; wherein the first portion of the housing and the second portion of the housing are mounted together to form an enclosed housing defining a droplet shape, and the first portion of the housing and the second portion of the housing are spaced apart to form an interior compartment within the housing; and, at least one motor driven propeller mounted in the interior compartment within the housing, wherein the pores of the first portion and the pores of the second portion are constructed and arranged to permit air to pass from an exterior of the housing to the interior compartment of the housing and to an exterior of the housing through the first portion and the second portion, and wherein air is pulled through the housing by the at least one motor driven propeller.

In another aspect, the unmanned aerial vehicle interior compartment may include electrical or nonelectrical operational components for the unmanned aerial vehicle.

In another aspect, the unmanned aerial vehicle may include a support structure housed within the interior compartment.

In another aspect, the support structure may include a K-frame.

In another aspect, the unmanned aerial vehicle may include at least one mounting point for the at least one motor driven propeller or other unmanned aerial vehicle components located on at least one of the K-frame, the top portion, or the bottom portion.

In another aspect, the support structure can be connected to a middle portion connecting to the top portion and/or the bottom portion.

In another aspect, the plurality of motor driven propellers can be mounted at different heights to allow adjacent motor driven propellers to overlap (e.g., on a plane of rotational diameter) without contacting.

In another aspect, the pores defined through the surface of the top portion or bottom portion can be at least about 1.0 to 2.0 millimeters in diameter or width with at least about a 0.03 millimeters to about 0.07 millimeters wall thickness between adjacent pores.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

Various embodiments of the disclosed apparatus are described herein with reference to the drawings wherein.

Figure 1:
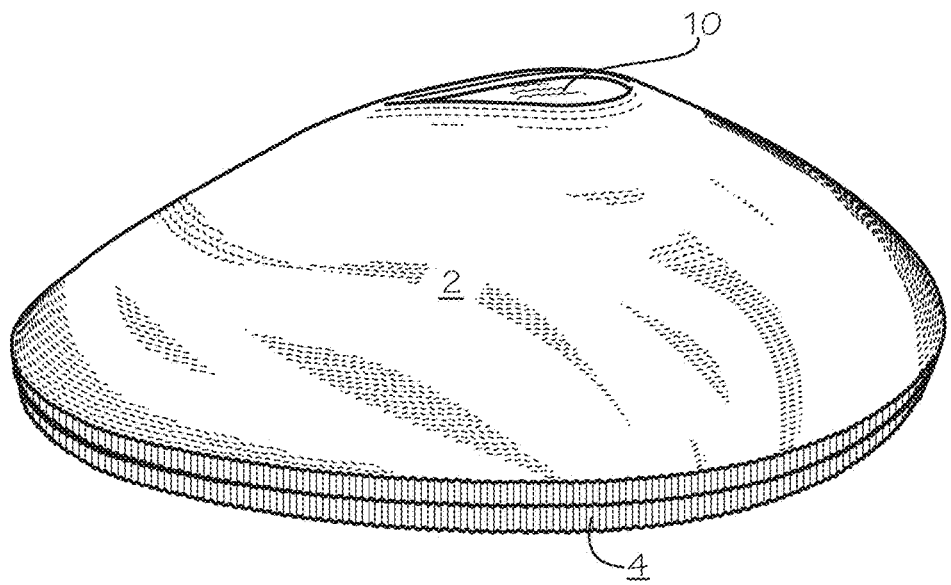
FIG. 1 shows an embodiment of housing for the device according to the embodiment of the invention, with the housing having a top portion and a bottom portion.
Figure 2:
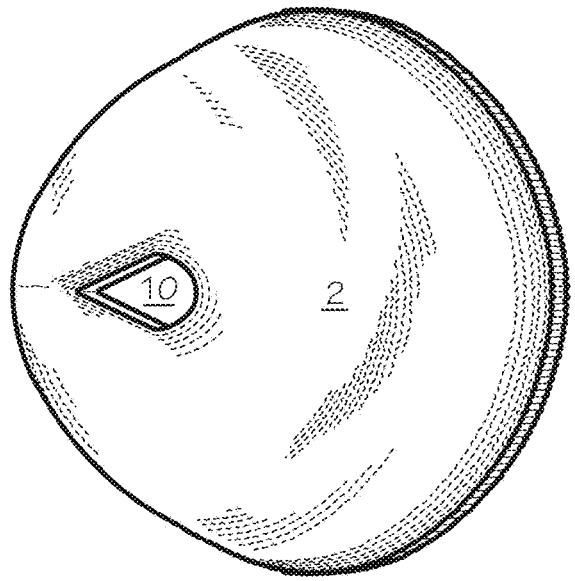
FIG. 2 shows primarily the top portion of the housing according to an embodiment of the invention.
Figure 3:
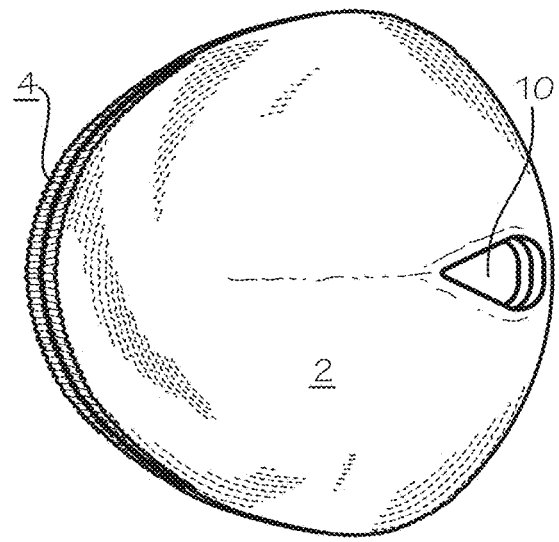
FIG. 3 shows another view of the housing for an embodiment of the device, primarily showing the top portion of the housing.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-reference numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary." Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

FIG. 1 shows an embodiment of the housing for a remote controlled flying device according to the disclosure. In an embodiment, the housing or body can be a unibody, which may be formed in two portions or parts that may be separated for access to the interior of the housing. The device may have a top portion 2 that is mounted to a bottom portion 4.

Figure 4:
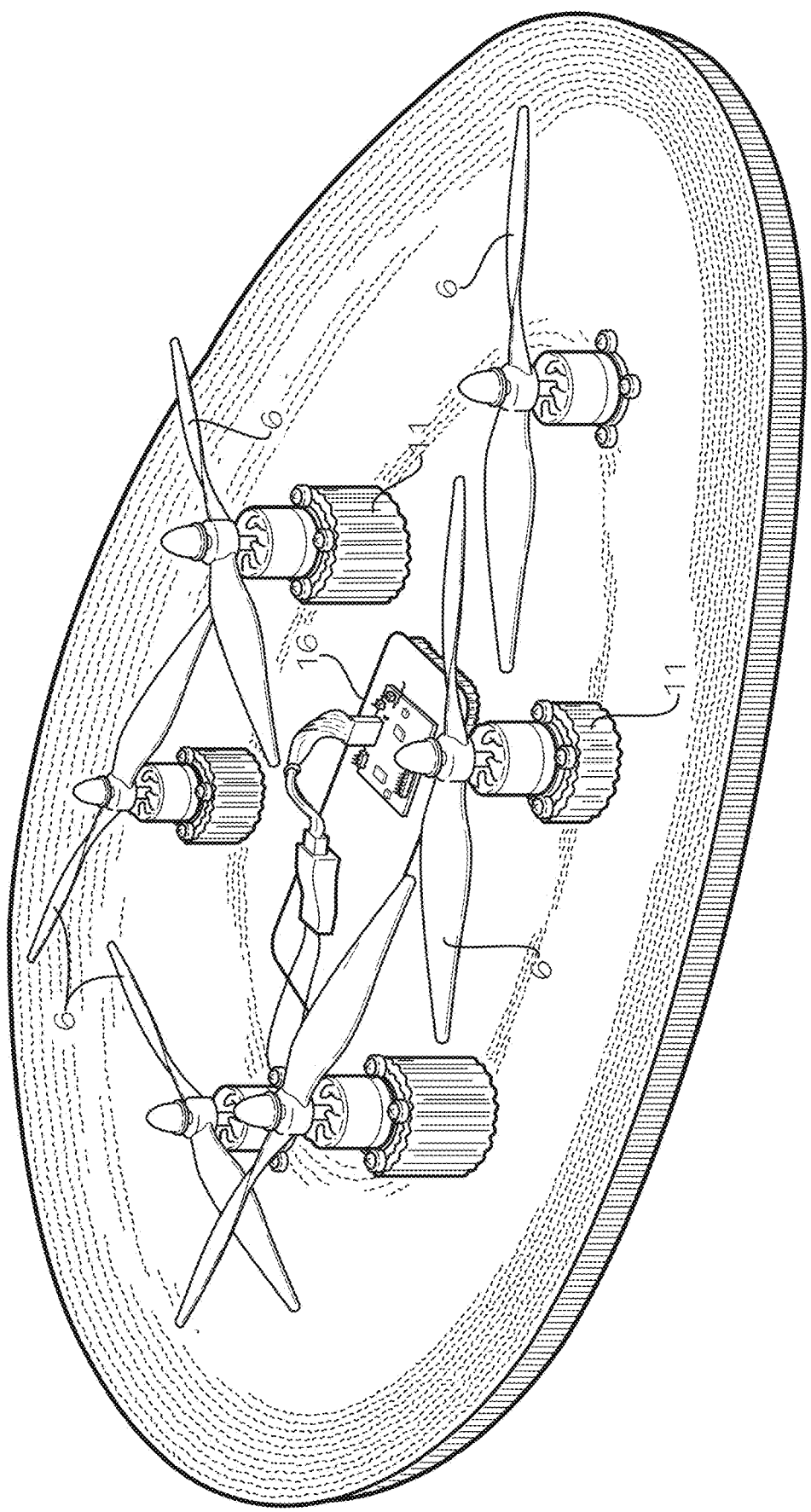
FIG. 4 shows a plurality of motor driven propellers mounted on the bottom portion of the housing of an embodiment of the device.
Figure 5:
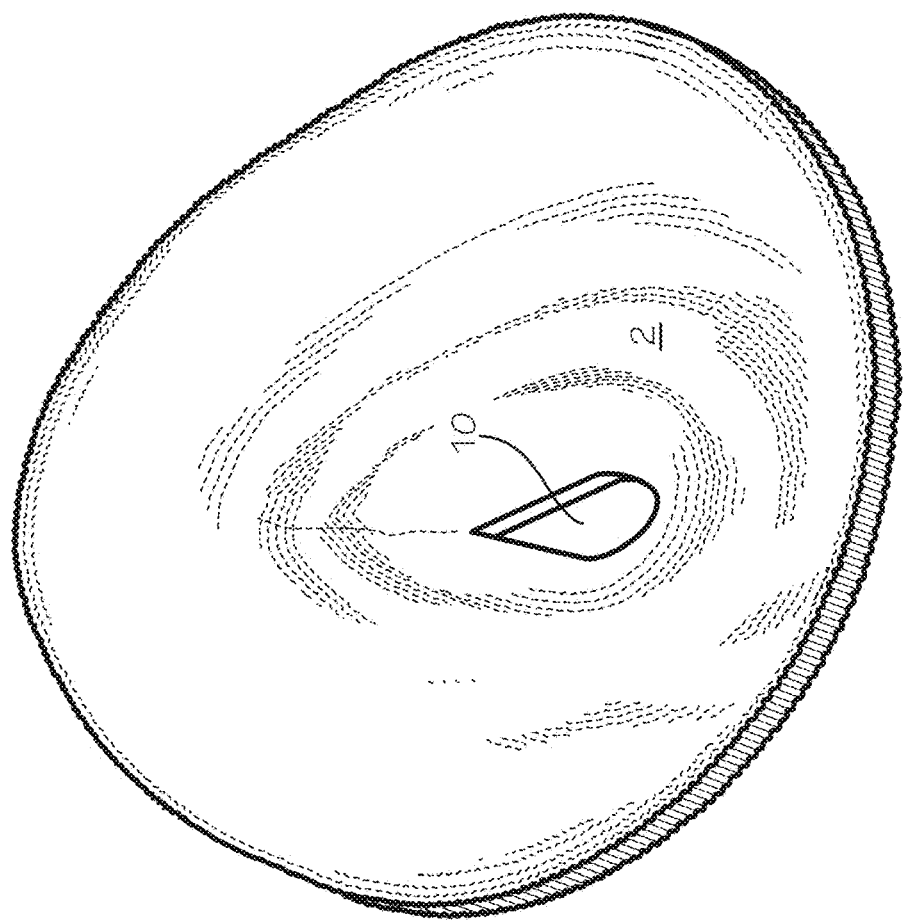
FIG. 5 shows the interior of the housing according to an embodiment of the device with the bottom portion and top portion of the housing shown side by side.
Figure 5:
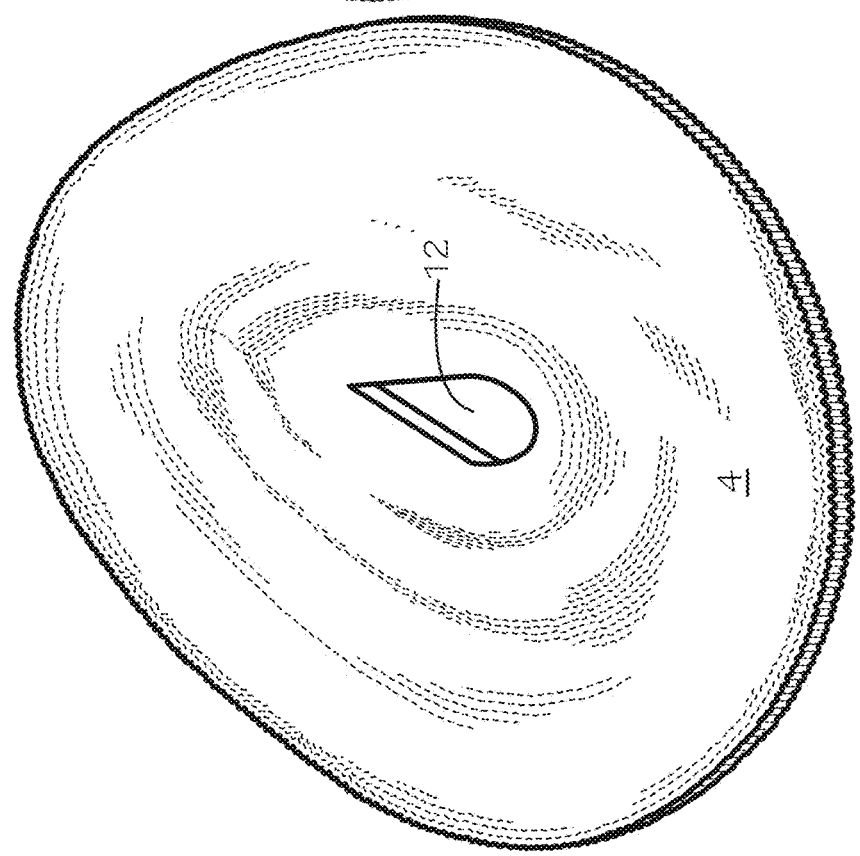

As shown in FIG. 5, the interior surfaces of the top portion and bottom portion are spaced apart. Electrical, mechanical and electro-mechanical parts of the device can be positioned within the interior of the housing. As shown in FIG. 4, a plurality of motor driven propellers 6, in this case, six (6) propellers can be mounted in the interior of the housing. Also mounted in the interior of the housing can be operational devices 16, such as radio receivers, for remote control of the device, and navigational controls and other devices as required. In certain embodiments, an interior wall can include individual levels, recesses, platforms or bridges to accommodate spaces for mounting motors, batteries, flight control boards, speed controls and/or any other suitable components, positioned at a desired height or plane relative to allowable interior space. These areas may be formed, such as by molding, milling or cutting, into the interior walls, so that body and interior mounting points are one piece in a unibody configuration. One or more portions of the housing may be additively manufactured (e.g., 3D printing). Motors may be mounted on columns 11 of varying height so as to accommodate larger, overlapping propellers within the allotted space. Propeller tips may overlap neighboring propeller tips on different planes. In certain embodiments, propeller tips may remain in the same plane such that propeller tips do not overlap.

Actuators for the navigational controls may also be mounted within the interior of the housing, and/or the exterior of the housing. Mounting of remote control receivers, motors, and navigational control systems, such as ailerons and rudders, and actuators devices is within the purview of one skilled in the art of constructing remote control flying devices.

Preferably, the device does not include any interior elevator, aileron or rudder control surfaces. Directional control can be accomplished by counter rotating motor/props and/or varying individual motor speeds. The motors and props can control pitch, roll and yaw. One or all motors may be mounted on tilting motor mounts to effect additional or complimentary directional change. Elevator, aileron and/or rudder control surfaces may be incorporated into the exterior of the design with addition of winglets, vents or such.

Figure 6:
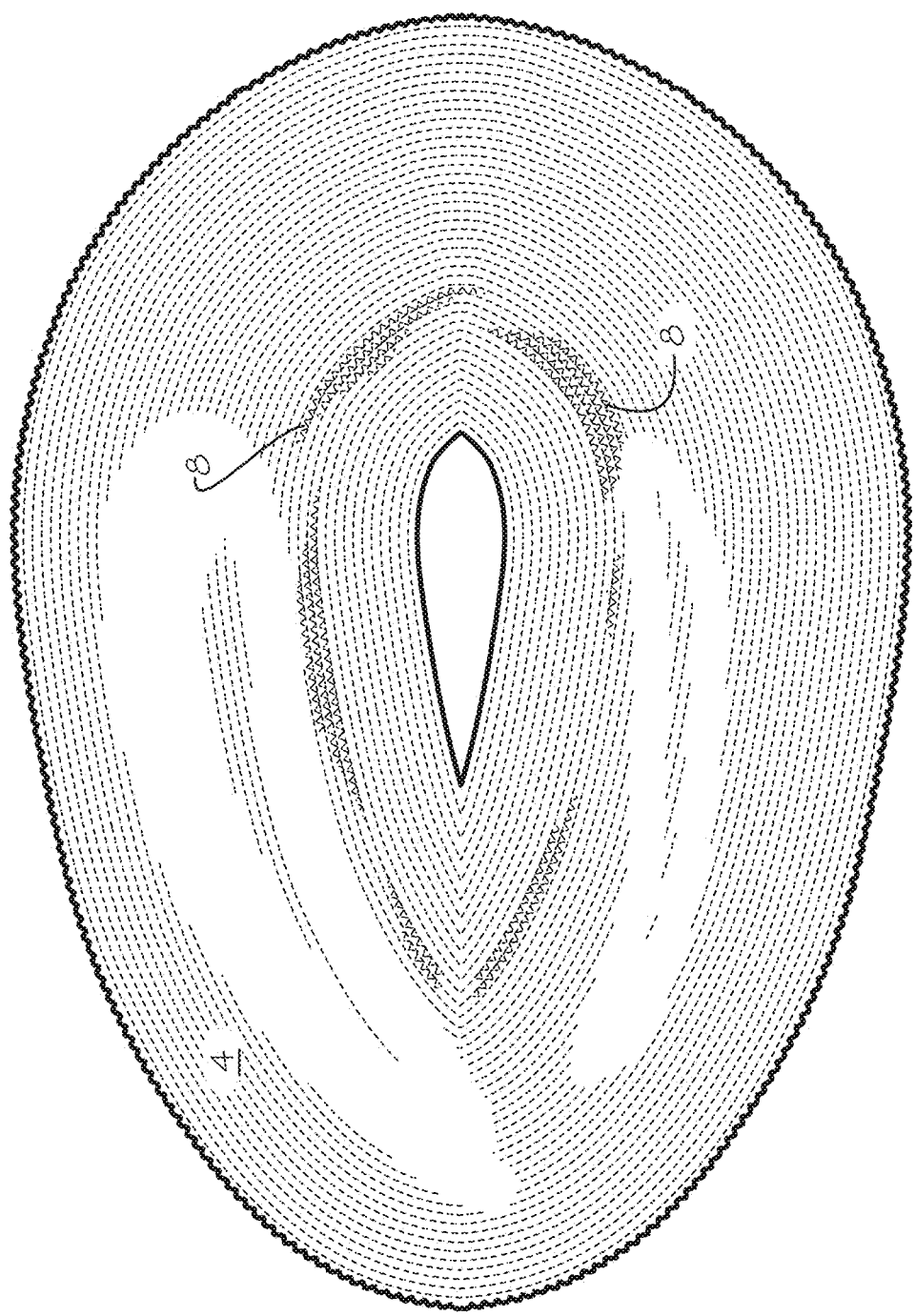
FIG. 6 shows the top portion of the housing.

As shown in FIG. 6, the housing can be formed so as to have continuous pores 8 in substantially all, or a majority, of the surface of the housing. The pores allow air to flow through the housing. Mounting of the propellers in the interior of the housing causes air to be pulled through the housing by the propellers, with one side of the housing acting as an inlet. The air is exhausted through an opposite side of the housing, acting as an outlet. For example, with the motors mounted as shown in FIG. 4, the top portion of the housing acts as an inlet, and the bottom portion of the housing allows air to be exhausted through the pores in the bottom portion of the housing. However, in some cases, one or more of the propellers may be reversed in direction of rotation, causing air flow through the housing to be reversed. Speed, altitude and direction of the device may be controlled by the speed and direction of rotation of the motors. Some motors may be mounted inverted while others may be mounted vertical, depending on the embodiment. Propellers and motors may or may not be mounted and/or spaced on different plains to allow propeller tip overlap and tighter motor space geometry. This gives greater flexibility in overall outer housing shapes, such as the droplet shape.

Figure 7:
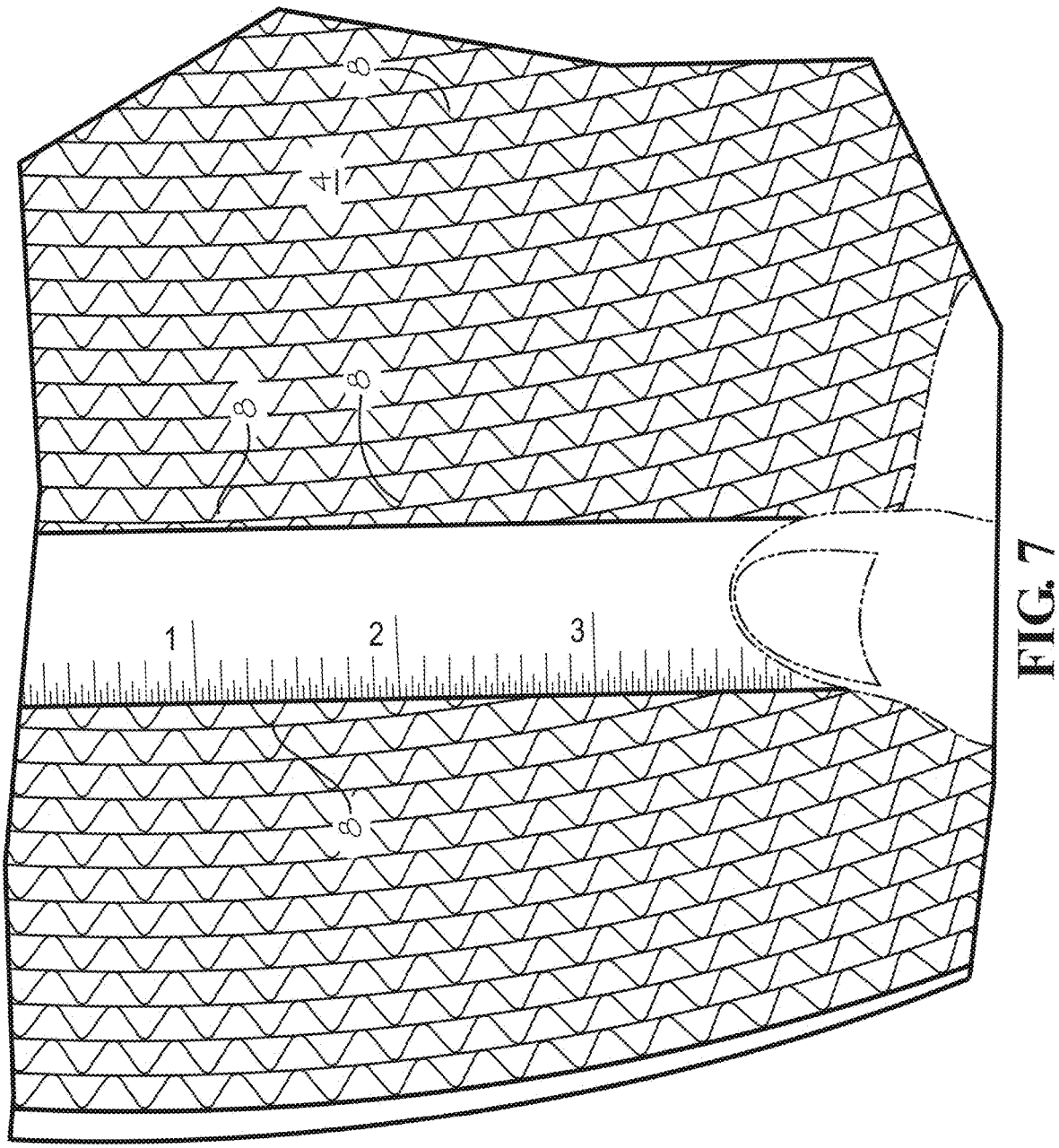
FIG. 7 shows a partial view of the housing, which is enlarged to show pores in the housing.

The pores 8 of the body that allow air to flow through the body are formed in the body, which can be a unibody construction. The body may be formed of corrugated or fluted paper, plastic, metal, carbon fiber, foam and/or other materials that will form a body surface that is aerodynamic, but which also allows air to pass through the pores formed in substantially the entire surface, or at least a majority of the body surface. The air passes into, and through, the interior of the body and out of the body. Corrugated construction of the body is shown in FIG. 7.

The body may be formed by machine, injection molding, or by 3D printing, for example, depending upon the material from which the body is formed. The body or unibody may be formed in desired shapes, including novel shapes, or shapes that mimic known shapes of other devices or articles. The surface of the body may be imaged with indicia, logos, or graphic designs, as long as the pores of the body are not obstructed.

As shown in FIG. 5, the body may have a few openings 10, 12 that are larger than the pores (e.g., to allow griping of the housing). These openings may be sufficiently small so that an average size of a hand of an adult human cannot be inserted into the interior of the housing. In certain embodiments, the body has no openings (other than the pores), which may improve aerodynamics.

In certain embodiments, the pores sizes can be no larger than about 40 millimeters, and no smaller than about 0.5 millimeters. The pores can cover at least fifty percent of the surface of the top and fifty percent of the surface of the bottom of the housing, for example, but any suitable arrangement, coverage area, hole size, shape, and/or pattern is contemplated herein. For example, the pore size can change from smaller in the front (e.g., about ¼ inch), to larger in the middle portion (e.g., about ½ inch), to smaller again in the back (e.g., about ¼ inch). The change can be gradual and/or abrupt in certain embodiments.

In certain embodiments, no more than two openings larger than the pores may be formed in the top portion of the housing, and no more than two openings larger than the pores may be formed in the bottom portion of the housing. These openings in the body may be no larger than about 150 centimeters (e.g., in embodiments of the body that are sized for lifting by a single person).

The materials from which the housing is formed may have crash and impact absorbing body properties. The body properties may be such that upon deformation due to impact, the body will not be cut or torn, and may further be resilient and regain its shape after the force of impact cease, or may be easily pulled to the original shape. For this reason, forming the body of polymer or plastic is suitable in many applications. Any other suitable material is contemplated herein. The use of a body surface having entirely arcuate surfaces instead of sharp angles to form the body surface may improve aerodynamics for example, however, any suitable shape is contemplated herein.

Purposely engineered reliefs, channels, or valleys, or individual areas of thinning of material thickness on the inside of the walls of one or all parts of the unibody may form crumple zones of the body. In an embodiment, the pores defined through the surface of the top portion or bottom portion are 1.58 millimeters in diameter or width and 0.03 millimeters wall thickness between adjacent pores. In certain embodiments, material can be cut, or ground out in addition to being created by 3D printing. 3D printing may include any additive manufacturing or stereolithography (SLA) technique. 3D printing refers to various processes used to synthesize a three-dimensional object. In 3D printing, successive layers of material are formed under computer control to create an object. SLA or SL, also known as Optical Fabrication, Photo-Solidification, Solid Free-Form Fabrication, Solid Imaging, Rapid Prototyping, Resin Printing, and 3D printing, may be any form of additive manufacturing technology used for creating models, prototypes, patterns, and production parts in a layer by layer fashion using photopolymerization, a process by which light causes chains of molecules to link together, forming polymers. In certain embodiments, material can be molded through a plastic injection molding technique. Plastic injection molding can include any manufacturing process for producing parts by injecting material into a mold. Thinning and relief designs allow major impact points to fold, crumple, bend or distort inwardly, so as to absorb inertia, minimize impact force and contain and deflect inner parts from a surface of an object. Crumple zones can be designed to permanently distort (i.e. no spring back) without weakening structural integrity of a non-damaged model.

Figure 8:
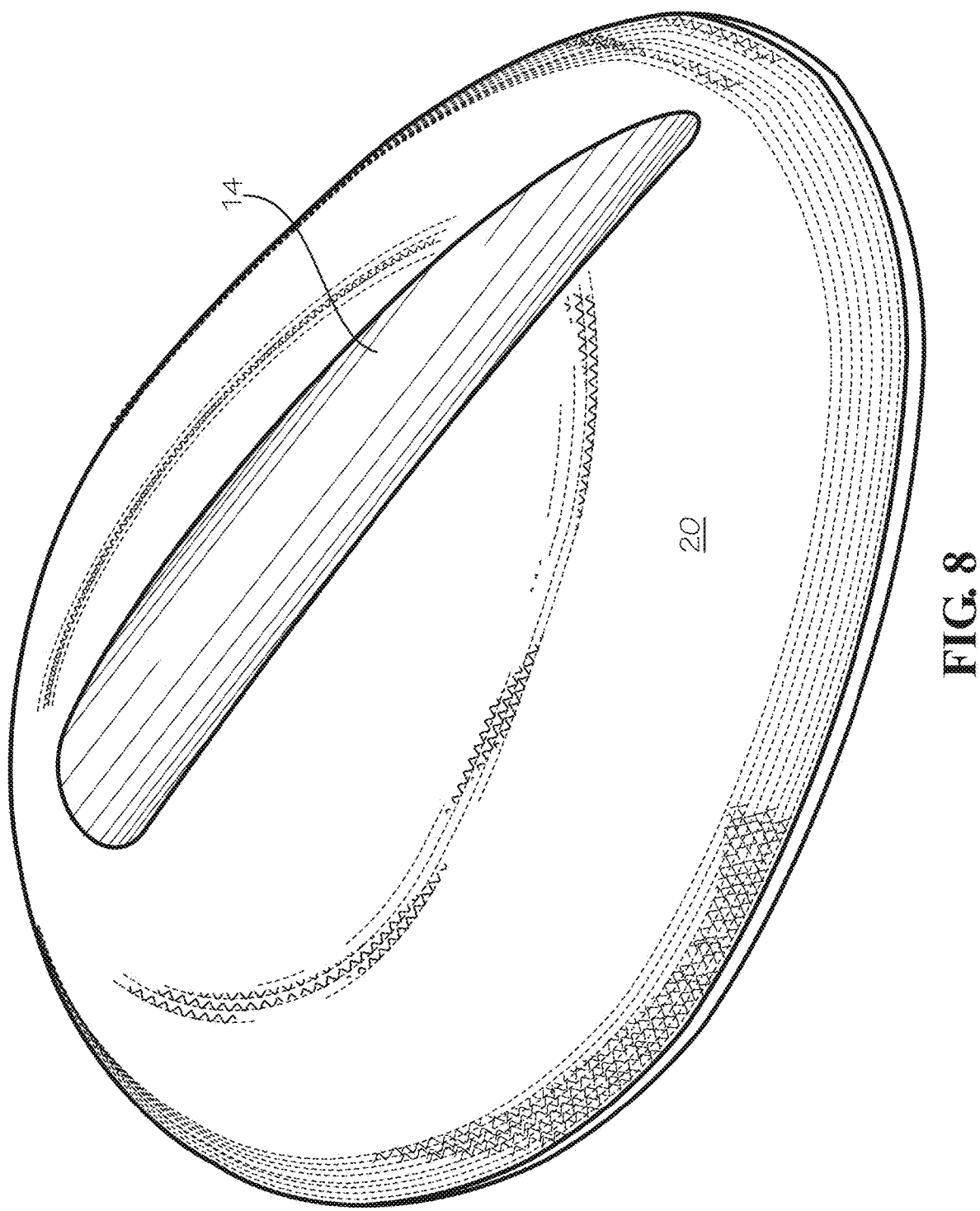
FIG. 8 shows another embodiment of the housing.

The device may be provided with an internal payload, which may be accessed through the holes or ports 10 as shown in the top of the housing FIG. 1, or through a removable panel 14 as shown in FIG. 8. A cargo compartment may be inserted into and mounted within the opening. The cargo compartment allows transportation by the flying device of payloads such as parcels, medicine, food, water, first aid supplies, as well as sensors for data collection or photography or videography.

In certain embodiments, the device may not have an overall weight of more than 30 kilograms. In general, the device may have a shape and size that is sufficiently small that it may be lifted and carried by a human of average size and strength but any size is contemplated herein.

Figure 9:
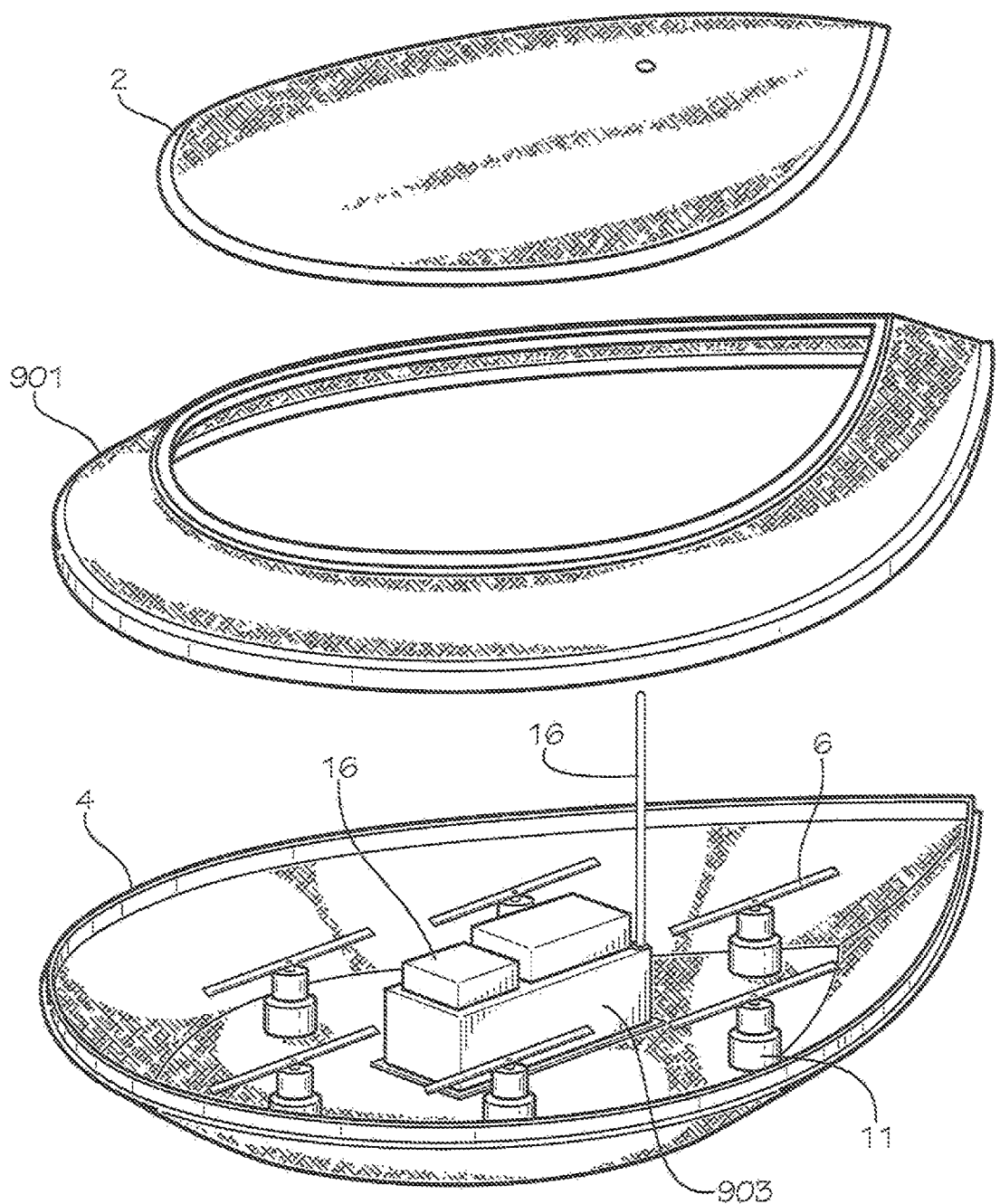
FIG. 9 shows an exploded view of an embodiment of an aircraft in accordance with this disclosure, shown with a middle portion.

FIG. 9 shows another embodiment of the device which can include a middle portion 901 that attaches to the bottom portion 4 and top portion 2. In certain embodiments, the middle portion can act as a housing extension, creating a larger interior compartment for additional components. Bottom portion 4 and top portion 2 may attach to middle portion 901 through a variety of attachment means, including; screws, bolts, clamps, adhesive tape, snaps, magnets, and the like. Bottom portion 4 may be concave in shape and top portion 2 may be convex in shape. Middle portion 901, bottom portion 4 and top portion 2 may be configured such that when assembled as a unitary structure, a front portion of the device is more bulbous or larger than a rear portion of the device thereby defining an oblong pear or droplet shape of the device. Middle portion 901, bottom portion 4 and top portion 2 may be constructed of carbon fiber, carbon fiber infused thermoplastic, wood infused thermoplastic, metal infused thermoplastic, ceramic and/or ceramic infused thermoplastic. Bottom portion 4 and top portion 2 may allow for mounting of exterior attachments including cameras, light fixtures, sensors, winglets, electronics, displays or other enhancements. Middle portion 901, bottom portion 4 and top portion 2 may vary in size and scale from palm-sized bodies up to approximately 60 pound units. According to an embodiment, middle portion 901, bottom portion 4 and top portion 2 may be about 100 to 150 centimeters in length, about 40 to 100 centimeters in width, and about 15 to 50 centimeters in height.

The surface of the middle portion can include a plurality of pores that are physically similar in size, shape, and spacing to that of the top portion 2 and bottom portion 4. Further, the pores can be functionally similar to those defined in the top portion 2 and bottom portion 4 by allowing the flow of air. It is contemplated that the middle portion 901 need not have pores, and/or that the pores of the middle portion be different than those on the top portion 2 and/or bottom portion 4. Pores may be uniform or non-uniform in pattern, and the size, shape and spacing of the pores may vary from a forward portion of the device to a rear portion of the device. In an embodiment, pores may be configured in an octagonal honeycomb pattern. Other shapes and patterns may include squares, triangles, circles, hexagons, polygons, rectangles, and other geometric or irregular shapes.

In certain embodiments, motor driven propellers 6, columns 11, and/or other operational devices 16 can be disposed on the bottom portion 4 and/or the top portion 2. The bottom portion 4 can include a cargo bay 903 that is either integrated as part of the bottom portion 4 during manufacture or incorporated after manufacture as an additional component, for example. In certain embodiments, the cargo bay 903 can open up to the bottom of the bottom portion 903 to store or release its contents. In an alternative embodiment, middle portion 901, bottom portion 4 and top portion 2 may be coupled around a commercial off-the-shelf drone to encapsulate an enclosed body around the drone.

Figure 10:
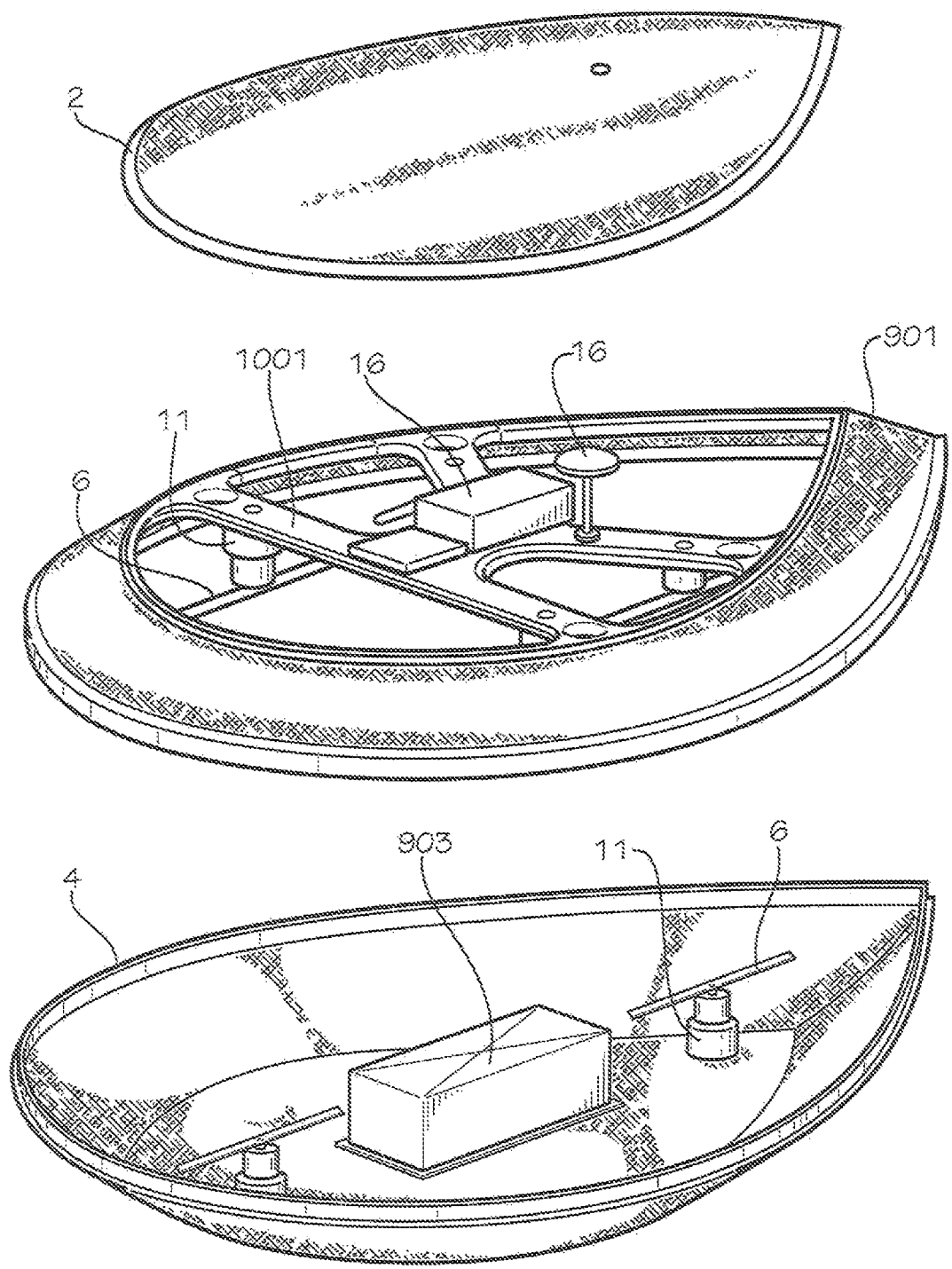
FIG. 10 shows an exploded view of the embodiment of FIG. 9, shown having a K-frame attached to the middle portion.

In certain embodiments, referring to FIG. 10, the middle portion 901 can include a support structure disposed therein. In certain embodiments, the support structure can include a K-frame 1001 (e.g., which spans the inner width of the middle portion) as shown. The K-frame 1001 can include any variation of symmetrical or asymmetrical intersection of cross members spanning the width or length of the middle section. K-frame 1001 may also be configured as an X-frame or a star-shaped frame; and may be configured as a six-sided, six armed, or hexa-frame. Furthermore, the K-frame 1001 can be made of any suitable material for use with unmanned aerial vehicles; e.g., metal, polymer, thermoplastics such as PLA, ABS, polypropylene, and other hybrid plastics as mentioned herein, parchment, and metal alloy.

In certain embodiments, the K-frame 1001 can be used to support one or more motor driven propellers 6, columns 11, or other operational devices 16 such as controllers, electronics, GPS modules, antennas, computer boards and the like. The motor driven propellers 6, columns 11, or other operational devices 16 can be mounted to any suitable portion of the K-frame 1001 (e.g., on the top or bottom sides of the K-frame 1001) in any suitable manner.

Figure 11:
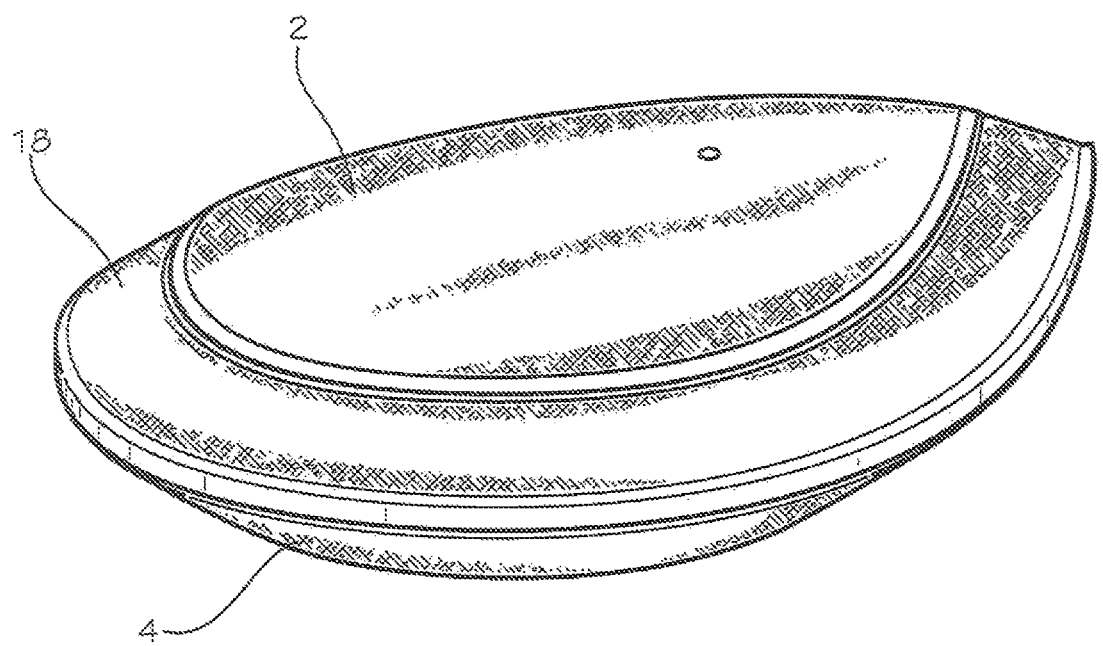
FIG. 11 shows an isometric view of the embodiment of FIG. 9 shown with a top portion, middle portion, and base portion assembled together.

The K-frame 1001 can be secured to the middle section or integrated into the middle portion 903 itself (e.g., a 3D printed or molded middle section with integrated K-frame for example). An assembled view of an aerial vehicle with middle portion 903 is shown in FIG. 11.

Embodiments of the housing as described above allow the aircraft to contact humans, animals, structures, vegetation, and other objects without presenting a danger of physical harm, or harm to humans, animals and structures, or to the propellers, from propeller rotation. The enclosed body also prevents the propellers from becoming entangled in vegetation. Placing propellers internal to the body of the device prevents the propellers from coming in contact with humans, animals, structures, vegetation and other objects. Further, by having internal propellers, the sound signature of the device may be reduced, allowing for more silent operation than a device having exposed propellers.

The device also may be used indoors, since there is no danger of propeller strikes, and the housing can be formed to be damage resistant and impact resistant. Incidental contact with humans and other objects does not present a threat of injury to humans or objects from propeller strikes. Accordingly, the device can be used to deliver payloads indoors, particularly in warehouse and factory settings. The device may be intercepted with bare human hands without fear of propeller strikes.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. An unmanned aerial vehicle, comprising:
  an enclosed housing having:
    a top portion, the top portion constituting an upper surface of the unmanned aerial vehicle and having a first plurality of pores constructed from a rigid material and defined through a surface thereof;
    a bottom portion, the bottom portion constituting a lower surface of the unmanned aerial vehicle and having a second plurality of pores constructed from the rigid material and defined through a surface thereof;
    a middle portion coupled to an upper perimeter of the bottom portion at a lower perimeter of the middle portion and coupled to a lower perimeter of the top portion at an upper perimeter of the middle portion to define the enclosed housing, the middle portion constituting a middle surface of the unmanned aerial vehicle and having a third plurality of pores constructed from the rigid material and defined through a surface thereof;
wherein interior surfaces of the top portion, the middle portion and the bottom portion are spaced apart so as to at least partially form an interior compartment within the enclosed housing;
a support structure disposed within the interior compartment, the support structure comprising a K-frame; and
a plurality of motor driven propellers mounted at different heights in the interior compartment,
wherein a first motor driven propeller in the plurality of motor driven propellers is mounted directly to a surface of the second plurality of pores on the bottom portion and a second motor driven propeller in the plurality of motor driven propellers is mounted directly to the K-frame,
wherein the top portion of the enclosed housing constituting the upper surface of the unmanned aerial vehicle is positioned above the plurality of motor driven propellers and the bottom portion of the enclosed housing constituting the lower surface of the unmanned aerial vehicle is positioned below the plurality of motor driven propellers, and
wherein the first, second and third pluralities of pores are constructed and defined within the upper and lower surfaces of the unmanned aerial vehicle and arranged to permit air to pass from an exterior of the unmanned aerial vehicle to the interior compartment of the enclosed housing through the top portion and from the interior compartment out to the exterior of the unmanned aerial vehicle through the bottom portion, wherein air is pulled through the enclosed housing by the plurality of motor driven propellers in a vertical direction from the top portion of the enclosed housing positioned above the plurality of motor driven propellers to the bottom portion of the enclosed housing positioned below the plurality of motor driven propellers.

2. The unmanned aerial vehicle of claim 1, further comprising electrical or nonelectrical operational components of the unmanned aerial vehicle disposed within the interior compartment, wherein at least one of the electrical or nonelectrical operational components are mounted directly to the surface of the second plurality of pores on the bottom portion.

3. The unmanned aerial vehicle of claim 1, wherein mounting points for at least one motor driven propeller or other unmanned aerial vehicle components are located on both of the K-frame and the bottom portion.

4. The unmanned aerial vehicle of claim 1, wherein the first plurality of pores defined through the surface of the top portion and the second plurality of pores defined through the surface of the bottom portion have a diameter of from 0.5 to 40 millimeters and are spaced so as to have a wall thickness between adjacent pores of at least 0.3 millimeters.

5. An enclosed unmanned aerial vehicle comprising:
a top portion of a housing comprising an upper surface of the enclosed unmanned aerial vehicle and comprising a first plurality of pores and constructed from a rigid material and disposed through the upper surface, the top portion of the housing being concave in shape and tapered in width from a first end to a second end and comprising an aperture disposed on a central portion of the upper surface, the aperture being larger in size than a size of a pore of the first plurality of pores;
a bottom portion of the housing comprising a lower surface of the enclosed unmanned aerial vehicle and comprising a second plurality of pores constructed from a rigid material and disposed through the lower surface, the bottom portion of the housing being convex in shape and tapered in width from a first end to a second end;
a middle portion of the housing comprising side walls of the enclosed unmanned aerial vehicle and comprising a third plurality of pores constructed from a rigid material and disposed through the side walls of the enclosed unmanned aerial vehicle,
wherein the top portion of the housing, the middle portion of the housing and the bottom portion of the housing are mounted together to comprise a unibody configuration and interior surfaces thereof are spaced apart so as to form an internal compartment within the housing defining a droplet teardrop shape; and
a plurality of motor driven propellers mounted on interior mounting points in the interior compartment within the housing,
wherein at least one interior mounting point of the interior mounting points is disposed directly on a surface of the second plurality of pores,
wherein the top portion of the housing is positioned above the plurality of motor driven propellers mounted on interior mounting points in the interior compartment within the housing and the bottom portion of the housing is positioned below the plurality of motor driven propellers,
wherein the middle portion of the housing comprises a third plurality of pores on a surface thereof and is tapered in width from a first end to a second end, and
wherein the first plurality of pores of the top portion and the second plurality of pores of the bottom portion are constructed and arranged to permit air to pass from an exterior of the enclosed unmanned aerial vehicle to the interior compartment of the housing through the top portion and from the interior compartment out to the exterior of the enclosed unmanned aerial vehicle through the bottom portion, wherein air is pulled through the housing by the plurality of motor driven propellers in a vertical direction from the top portion of the housing positioned above the plurality of motor driven propellers to the bottom portion of the housing positioned below the plurality of motor driven propellers.

6. The enclosed unmanned aerial vehicle of claim 5 further comprising electrical or nonelectrical operational components of the unmanned aerial vehicle disposed within the internal compartment, wherein at least some of the electrical or nonelectrical operational components of the unmanned aerial vehicle are disposed directly on the surface of the second plurality of pores.

7. The enclosed unmanned aerial vehicle of claim 6 further comprising a support structure disposed on the middle portion of the housing within the internal compartment, wherein at least some of the electrical or nonelectrical operational components of the unmanned aerial vehicle are disposed directly on the support structure.

8. The enclosed unmanned aerial vehicle of claim 5 wherein a shape of the first and the second plurality of pores is selected from the group consisting of octagonal, square, triangular, circular, hexagonal, polygonal, rectangular, geometric and irregular.

9. The enclosed unmanned aerial vehicle of claim 5 further comprising an aperture disposed on a central portion of the bottom portion of the housing, the aperture being larger in size than a size of a pore of the second plurality of pores.

10. The enclosed unmanned aerial vehicle of claim 5 wherein the plurality of motor driven propellers are mounted at different heights to allow adjacent motor driven propellers in the plurality of motor driven propellers to overlap without contacting, wherein at least one motor driven propeller in the plurality of motor driven propellers is coupled to the at least one interior mounting point that is disposed directly on the surface of the second plurality of pores.

11. The enclosed unmanned aerial vehicle of claim 7 wherein the support structure forms a K-frame.

12. The enclosed unmanned aerial vehicle of claim 5 wherein the housing and interior mounting points are formed as one piece in a unibody configuration by molding, milling or cutting into an interior wall of the top and bottom portions of the housing.

13. The enclosed unmanned aerial vehicle of claim 5 wherein a shape of a front portion of the enclosed unmanned aerial vehicle is larger than a rear portion and defines a pear shape.

\* \* \* \* \*